United States Patent [19]

Miki et al.

[11] Patent Number: 4,492,429
[45] Date of Patent: Jan. 8, 1985

[54] MOUNTING DEVICE OF OPTICAL UNIT

[75] Inventors: Yukio Miki, Sakai; Takeshi Egawa, Osaka, both of Japan

[73] Assignee: Minolta Camera Kabushiki Kaisha, Osaka, Japan

[21] Appl. No.: 380,872

[22] Filed: May 21, 1982

[30] Foreign Application Priority Data

May 25, 1981 [JP] Japan .................. 56-79768

[51] Int. Cl.³ .................. G02B 7/02
[52] U.S. Cl. .................. 350/257
[58] Field of Search .................. 350/257, 252; 354/286

[56] References Cited

U.S. PATENT DOCUMENTS 2,083,637  6/1937  Colaiace .................. 350/257
3,620,149 11/1971  Ogihara .................. 354/286

Primary Examiner—William H. Punter
Attorney, Agent, or Firm—Watson, Cole, Grindle & Watson

[57] ABSTRACT

As improved mounting device for an optical unit consists of two optical components, one of which is mounted on the other, or else demounted therefrom, by relative rotation of the two with sliding contact of mating seating and mounting faces thereof, wherein in the seating face of the one optical component is formed a positioning recess which is engaged by a positioning member of the other optical component. The positioning member is constantly urged to project beyond the associated mounting face when the other optical component is properly mounted on the one optical component. Along a circular path on the seating face adjacent to the positioning recess is provided an accommodation groove which accommodates the positioning member when the one optical component is turned relative to the other optical component.

6 Claims, 7 Drawing Figures

MOUNTING DEVICE OF OPTICAL UNIT

BACKGROUND OF THE INVENTION

1. Field of the Invention

The present invention generally relates to a mounting device of an optical unit consisting of two optical components, and more particularly to a mounting device of the type for effecting mounting of one of the two optical components on the other by relative rotation of mating seating and mounting faces of the two optical components (of, e.g., bayonet type), wherein in the seating face of the one optical component is formed a recess which is engaged by an engaging member of the other optical component urged to constantly project beyond the mounting face when the former is properly mounted on the latter.

2. Description of the Prior Art

A conventional mounting device of an optical unit consisting, for instance, of a camera body and an interchangeable lens, essential parts of which are shown enlarged in FIG. 1 with the front wall plate of the former as A and the latter conceptually as B, is provided with an engaging member such as a positioning member for positioning both components in proper mounted relationship and an electrode for electric signal transmission between the two components.

The engaging member C is urged to project beyond the mounting face D on the camera body side and is engaged in a recess F formed in an annular seating face E of the interchangeable lens B when the lens B is properly mounted on the front wall plate A of the camera body. It serves to achieve predetermined functions such as mutual positioning of both optical components and transmission of signals therebetween.

When the interchangeable lens B is turned relative to the front wall plate A of the camera body for mounting on or demounting from the latter by engagement or disengagement of bayonet pawls G and H on B and A sides, the annular seating face E is required to be pressed on the mounting face D. To this end, it is necessary during the mounting or demounting operation to continuously press the annular seating face E of the interchangeable lens B on the mounting face against the positioning member C which is urged by the force of a spring loaded inside the camera body. In this case, as the recess F is formed only at a given angular position on the annular seating face E as shown in FIG. 1 and FIG. 2, hard sliding contact takes place between the annular seating face and the positioning member C with resultant risk of damage to both and, moreover, an unpleasant feel to the user when mounting or demounting the interchangeable lens B. Especially the mounting operation involving engaging the bayonet pawls G and H one another (rotation of the interchangeable lens B in the direction indicated by the arrow in FIG. 2) cannot be accomplished unless the interchangeable lens B is pressed against the front wall plate A of the camera body with sufficient force to overcome the force urging the positioning member C outward, i.e., to bring the mating mounting and seating faces D and E into close contact. If the mounting operation described above is proceeded with forcibly with a pressing force not enough to overcome the urging force, there occurs a risk of the bayonet pawls G and H failing to engage properly, resulting in damage caused to both. Thus, mounting an interchangeable lens on a camera body used to be by no means easy, requiring great care not to cause damage to either or both components of the camera.

With an auto-focus camera (not shown) of the type as described in a co-pending U.S. patent application Ser. No. 366,323, filed on Apr. 7, 1982 and entitled "Interchangeable Type Optical Unit in Optical System" (assigned to the same assignee), now U.S. Pat. No. 4,449,807 a camera body has in it a driving means for focusing the lens system of the interchangeable lens B with its driving shaft arranged to transmit a driving force to a focusing mechanism in the interchangeable lens B through a driven mechanism in the lens for cooperation with the engaging member C and the driving shaft. With such a construction, engaging member C is subjected to a still larger urging force required to ensure unfailing engagement of the driving shaft with the driven mechanism on the lens B side and ensure transmission of the driving force thereto, hence the engaging member is urged more forcefully to project beyond the mounting face D and the above-mentioned problem becomes more marked.

SUMMARY OF THE INVENTION

An object of the present invention is to provide a mounting device of an optical unit for overcoming the problems described above.

According to the present invention, there is provided a device in which a recess is formed in an annular seating face of one of two optical components, which is mounted on or demounted from the other by relative rotation with the mating seating and mounting faces in contact. The recess is engaged by an engaging member constantly urged to project beyond the mounting face of the other optical component when the both optical components are in proper mounted relationship. Adjacent to the recess on the annular seating face is formed an accommodating groove which extends circularly to accommodate the engaging member when the optical component is turned relative to the other optical component. The sliding contact pressure between the engaging member and the annular seating face in the course of relative rotation of both optical components is thereby largely reduced to a light and pleasant feeling, i.e., during a mounting or demounting operation, and potential damage to the annular seating face and the positioning member is reduced resulting in a marked improvement in the mounting accuracy.

The above and other objects and features of the present invention will become readily apparent by reference to the following description of the preferred embodiments taken in conjunction with the accompanying drawings.

DESCRIPTION OF THE PREFERRED EMBODIMENTS

Figure 3:
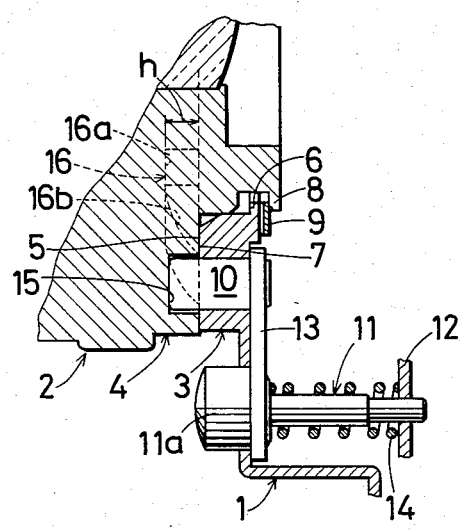
FIG. 3 is a partly sectioned view of a device according to a preferred embodiment of the present invention.
Figure 4:
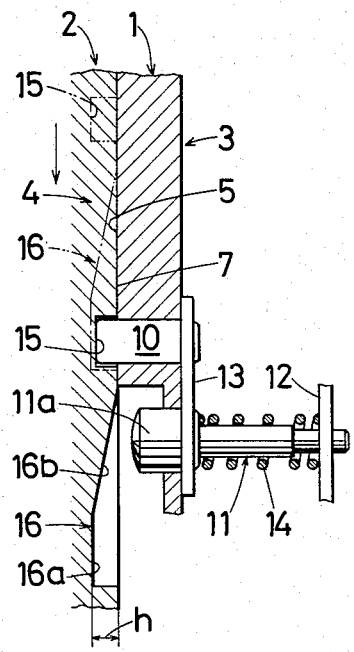
FIG. 4 is a schematic sectional view of a part of the device shown in FIG. 3, the part being exploded in the circular direction.

Referring now to FIGS. 3 and 4, which shows a preferred embodiment of the present invention, front wall plate 1 of a camera body and an interchangeable lens 2 are provided with a mount ring member 3 and a mount annular seat member 4, respectively, for mounting the latter on and demounting it from the former.

The mount ring member 3 has, as known, a mounting face 5 and bayonet pawls 6.

The mount annular seat member 4 is formed in the rear end face of the interchangeable lens barrel 2 and has a seating face 7 and bayonet pawls 8 arranged to be engageable with and disengageable from the bayonet pawls 6 with the mounting face 5 and seating face 7 in close contact. It is to be noted that only one of bayonet pawls 6 and only one of bayonet pawls 8 are shown in the FIGS.

Leaf springs 9, each thereof provided between the engaging faces of each bayonet pawl 6 and bayonet pawl 8, ensure close contact of the mounting face 5 with the seating face 7 and also ensure accurate lens-back (the distance between the seating face and the focal plane of the camera body), thus serving to ensure a high performance of the camera.

On the camera body side, there is provided a mount positioning member 10 urged to constantly project out of the mounting face 5 in the direction parallel to the optical axis. On one side of the mounting face 5 there is provided a mount releasing member 11 with its button 11a projecting out of the front wall plate 1 and held free to move forward and back between the front wall plate 1 and a base plate 12 integral therewith. The mount releasing member 11 and the mount positioning member 10 are connected with a connecting plate 13 so that both members 10 and 11 are urged to project out the mounting face 5 and the front wall plate 1, respectively, by a spring 14 loaded between the connecting plate 13 and the base plate 12.

In the seating face 7 of the interchangeable lens 2 there is provided a positioning recess 15 for engagement with the mount positioning member 10 when the interchangeable lens 2 is properly mounted on the camera body, and adjacent to the positioning recess 15 there is formed an accommodating groove 16 extending circularly along the turning path of the mount positioning member 10 and facing the positioning member 10. The groove 16 accommodates the member 10 as the interchangebale lens 2 is turned for mounting on or demounting from the camera body. The deepest section 16a of accommodating groove 16, which is remotest along its turning path from the positioning recess 15, has a depth h large enough to prevent contact of its bottom with the mount positioning member 10. This deepest section 16a extends to a position which the mount positioning member 10 occupies at the moment at least one pair of the bayonet pawls 6 and 8 on the camera body side and the interchangebale lens 2 side begins to engage. Beyond the deepest section 16a the groove 16 has its bottom up-sloped toward the positioning recess to form a guide slope 16b which causes the mount positioning member 10 to retreat to such a height as it advances in the accommodating groove 16 as required for it to enter the positioning recess 15 smoothly. The guide slope 16b is formed to reach the mounting face 5 in the vicinity of the positioning recess 15. It should be noted that the tip of the mount positioning member 10 is preferably inclined or curved properly to smoothen its movement on the guide slope 16b.

Mounting of the interchangeable lens 2 on the camera body is done by relative rotation of the lens 2 as it is turned from the position outlined in dotted line to the position outlined in full line. When the seating face 7 of the lens 2 is pushed against the mounting face 5 of the camera body in the first step of the mounting operation, the mount positioning member 10 is positioned in the deepest section 16a of the accommodating groove 16 (opposed thereto), hence the pressing effort is not interfered with. The interchangeable lens 2 is then turned in the direction indicated by the arrow with both faces 5 and 7 in close contact for engagement of the bayonet pawls 6 and 8 to take place but in the course of this turning the member 10 stays in the deepest section 16a until at least one pair of the pawls 6 and 8 begins to be engaged (to be exact, with the plate spring 9 in between), hence the pressing of the lens 2 against the camera body required for engagement of both pawls 6 and 8 is not interfered with, either.

When the lens 2 is turned being pressed lightly against the camera body, therefore, the first one pair or more of the bayonet pawls 6 and 8 can be engaged without failure, and thereafter the lens 2 is not pushed back off the camera body by the member 10 even if the lens pressing effort is eased or totally eliminated, and the lens 2 can be easily turned to the proper mounting position outlined in solid line. Thus, even if the mounting operation is proceeded with a reduced effort for pressing the lens 2, the bayonet pawls 6 and 8 can be brought into proper engagement and the lens 2 can be mounted in place on the camera body without failure with no risk of damage to either.

Furthermore, the mount positioning member 10 remains in the accommodating groove 16 for the most part of the time duration required for lens 2's rotation relative to the camera body to be completed for proper mounting or demounting of the lens 2. Hence, with the sliding contact pressure between the member 10 and the lens 2 reduced damage is, prevented to the member 10 as well as to the seating face 7, which remains out of contact with the member 10 almost during the mounting or demounting operation and, moreover, the mounting as well as demounting operation proceeds smoothly and lightly. In the course of mounting of the lens 2, the member 10 rides on the guide slope 16b of the accommodating groove 16 as engagement of the bayonet pawls 6 and 8 begins to take place. Then the member 10 retreats against the force of the spring 14 as it advances on the slope and, when the mounting has been completed, it is securely fitted in the positioning recess 15 for exact positioning of the lens 2 with respect to the camera body.

For demounting the lens 2, the mount releasing member 11 (its button 11a) is depressed, and the positioning member 10 is withdrawn from the recess 15 and, then, the lens 2 can be turned back for demounting.

Figure 5:
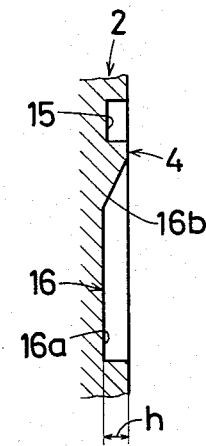
FIGS. 5 through 7 are partial schematic sectional views showing variations of the preferred embodiment in FIGS. 3 and 4, in an exploded manner as in FIG. 4.

In the variation shown in FIG. 5, the guide slope 16b is formed only in the vicinity of the positioning recess 15. This has a drawback of an increased gradient of the slope 16b but reduced is the extent in which the member 10 contacts the mount annular seat member 4.

Figure 6:
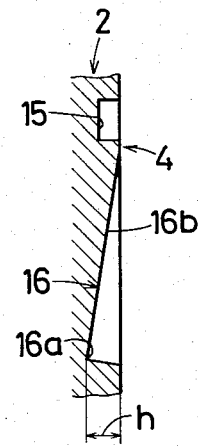

The variation shown in FIG. 6, in which the guide slope 16b is formed over the entire length of the accommodating groove 16, is better suited for machining, such as by end milling.

Figure 7:
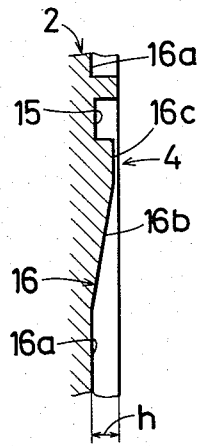

In the variation shown in FIG. 7, the accommodating groove 16 is formed along substantially the entire periphery of the seating face 7, with a shallow groove 16c provided between the positioning recess 15 and the guide slope 16b so that, if damage to the shallow groove 16c should result from the sliding contact with the tip of the member 10, the seating face 7 is perfectly safe from damage.

As is apparent from the explanation above, the present invention is useful for mounting devices having engaging means urged to project from one to the other optical components of an optical unit even where there are provided a plurality of such means. The engaging means is a positioning means in the above-mentioned embodiment but may be an electrode or various switching means such as a so-called AE switching pin for introducing to the camera body information that a diaphragm presetting ring of the interchangeable lens is at a specific position and thereby changing over a circuit in the camera body for automatic exposure control such as shutter speed priority automatic aperture control.

In the above-mentioned embodiment the mount positioning member 10 and the mount releasing member 11 are both on the camera body side and the present invention is applied to the interchangeable lens 2, but reversal thereof is also feasible. Additionally, the optical device to be mounted or demounted is meant to include also extension rings and bellows which are not provided with any lens as an optical component. Needless to say, the guide slope 16b may not be necessarily linear in gradient. The depth of the deepest section of the accommodating groove 16 may possibly be such that the mount positioning member 10 is in slight contact with its bottom.

Figure 1:
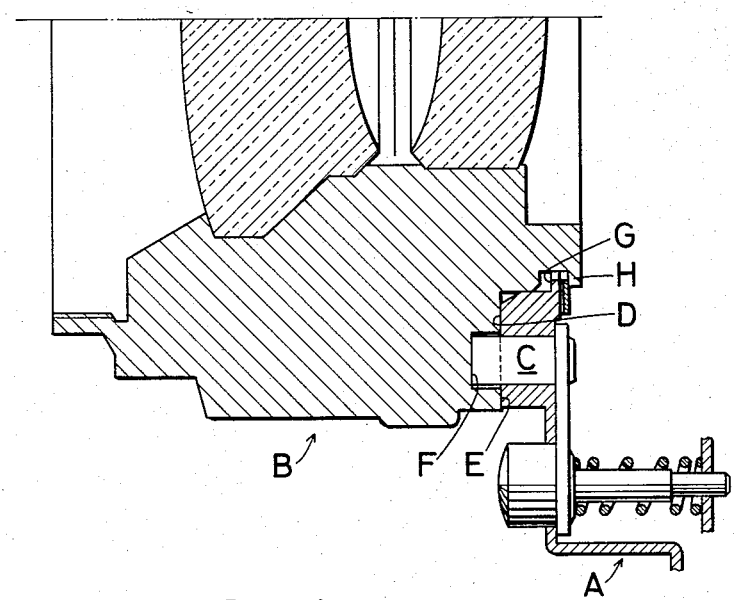
FIG. 1 is a partly sectioned view of a conventional like device.
Figure 2:
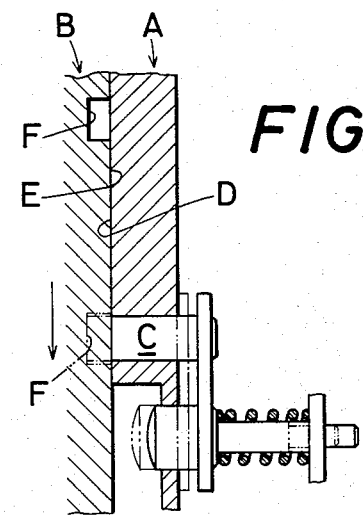
FIG. 2 is a schematic sectional view of part of the device shown in FIG. 1.

Since the accommodating groove 16 according to the present invention has such a depth that its bottom is either out of or in slight contact with the mount positioning member 10, the effort to press the interchangeable lens 2, etc., to cause the bayonet pawls 6 and 8 to begin engaging each other, is not or only slightly interfered with, so that the pawls 6 and 8 can be engaged with a small pressing force and thereafter the lens 2 can be turned with no pressing effort. Hence, with the device of the present invention the mounting operation is definitely easier than with a like conventional device and the risk of damage to the bayonet pawls 6 and 8 when the lens 2 is turned with an insufficient pressing force can be prevented, too. Moreover, the accommodating groove 16 is so formed that the mount-positioning member 10 is caused to retreat by the guide slope 16b in the vicinity of the positioning recess 15 to a height required for it to enter the positioning recess 15 to be engaged therein when the mounting operation is over, hence the function of the mount positioning member 10 is by no means affected. Furthermore, the mounting device of the present invention is constructed to allow the spring-urged positioning member to project into the accommodating groove during the mounting and demounting operation, so that it requires no mechanism which may hold the positioning member at the retreated position against the spring urge during that operation. Thus, it is only the accommodating groove that is added to a conventional mounting device shown in FIGS. 1 and 2 and accordingly the construction of the present invention brings about no increase in parts and in manufacturing costs, ensuring reliable and trouble-free mounting and demounting operation.

What is claimed is:

1. In an optical unit which includes a first optical device and a second optical device; said first optical device including a body member, a mounting surface connected to said body member, a bayonet pawl on said mounting surface, an engaging member mounted to extend away from said body member and biased to be located away from said body member, and a release means connected to said engaging means to move it toward said body member; said second optical device including a body member, a mounting surface on said body member, a bayonet pawl on said mounting surface, and an engaging recess, said engaging recess being capable of accommodating said engaging member; said first and second optical devices being connectable to one another by placing them together in a first relative positioning wherein their respective mounting surfaces contact one another and their respective bayonet pawls are aligned to engage one another, and then moving them relative to one another to a second relative positioning where their respective bayonet pawls engage one another and the engaging member of said first optical device lockingly extends into the engaging recess in said second optical device, said first and second optical devices being disengageable from one another by operating said release means of said first optical device and then causing said first and second optical devices to move from their second relative positioning to their first relative positioning, the improvement wherein said second optical device includes a groove therein in which the engaging member of said first optical device will extend when said first and second optical devices are moved from their first relative positioning to their second relative positioning and vice versa, said groove having a first end remote from said engaging recess and a second end adjacent said engaging recess, said groove having a maximum depth at said first end, a minimum depth at said second end and decreasing depth therebetween, said maximum depth being such that said engaging member therein is no more than slightly moved toward its respective body member when said first and second optical devices are in their first relative positioning with respect to one another.

2. The optical unit as defined in claim 1 wherein the mounting surface of said first optical device is annular, wherein the mounting surface of said second optical device is annular, and wherein the groove in said optical device extends along a circular path.

3. The optical unit as defined in claim 2 wherein the maximum depth of the groove in said second optical device is such that the engaging member of said first optical device will not be moved toward the body member of said first optical device.

4. The optical unit as defined in claim 2 wherein the groove in said second optical device has, as it extends from its first end to its second end, a first portion having a constant maximum depth and a second portion having a constantly decreasing depth.

5. The optical unit as defined in claim 4 wherein the groove in said second optical device includes a third portion having a constant mininum depth.

6. The optical unit as defined in claim 1 wherein said first optical device comprises a camera body and said second optical device comprises a lens assembly.

* * * * *